(12) United States Patent
Dev (10) Patent No.: US 10,621,496 B2
(45) Date of Patent: Apr. 14, 2020

(54) MANAGEMENT OF CONTEXT DATA (71) Applicant: SAP SE, Walldorf (DE)

(72) Inventor: Nipun Dev, Bangalore (IN)

(73) Assignee: SAP SE, Walldorf (DE)

(*) Notice: Subject to any disclaimer, the term of this patent is extended or adjusted under 35 U.S.C. 154(b) by 684 days.

(21) Appl. No.: 15/386,027

(22) Filed: Dec. 21, 2016

(65) Prior Publication Data
US 2018/0173786 A1 Jun. 21, 2018

(51) Int. Cl.
G06F 17/30 (2006.01)
G06N 5/00 (2006.01)
G06F 9/445 (2018.01)

(52) U.S. Cl.
CPC .......... *G06N 5/00* (2013.01); *G06F 9/44505* (2013.01)

(58) Field of Classification Search
CPC .............................. G06N 5/00; G06F 9/44505
See application file for complete search history.

(56) References Cited

U.S. PATENT DOCUMENTS

| | | | |
|---|---|---|---|
| 6,799,166 B2 | 9/2004 | Dorrance et al. | |
| 7,996,371 B1* | 8/2011 | Deshmukh | G06F 16/1748 707/692 |
| 8,577,371 B2 | 11/2013 | Arora et al. | |
| 8,639,848 B2 | 1/2014 | Fremantle | |
| 9,154,615 B1* | 10/2015 | Hegde | H04M 3/42042 |
| 9,413,852 B2 | 8/2016 | Lawson et al. | |
| 2009/0176520 A1* | 7/2009 | B. S. | G06Q 30/02 455/466 |
| 2009/0234958 A1* | 9/2009 | Lee | H04L 29/06 709/230 |
| 2011/0137960 A1* | 6/2011 | Price | H04M 1/72569 707/812 |
| 2012/0166377 A1* | 6/2012 | Sathish | G06N 5/025 706/47 |
| 2012/0311130 A1* | 12/2012 | Zadig | H04L 12/66 709/224 |
| 2013/0110794 A1 | 5/2013 | Lee | |
| 2014/0280138 A1 | 9/2014 | Li et al. | |
| 2015/0019553 A1 | 1/2015 | Shaashua | |

(Continued)

OTHER PUBLICATIONS

Naveen A N et al; "Client Side Deduplication Scheme for Secured Data Storage in Cloud Environments"; published in "International Journal of Engineering Research & Technology"; vol. 4 Issue 05, May 2015; 3 pages; https://www.ijert.org/view-pdf/13329/client-side-deduplication-scheme-for-secured-data-storage-in-cloud-environments.

(Continued)

*Primary Examiner* — Jared M Bibbee
(74) *Attorney, Agent, or Firm* — Fish & Richardson P.C.

(57) ABSTRACT

A context profile is created. The context profile includes one or more types of context data to be captured, frequency in which the one or more types of context data to be captured, data format in which the one or more types of context data is to be outputted and one or more custom data types. The context profile corresponds to an application identifier. A mapping of context profiles to application identifiers is created. Based on the mapping, the context profile is sent to a corresponding context provider.

Upon reception, the one or more types of context data are evaluated. Based on a number of data processing rules, the received context data can be processed or discarded.

19 Claims, 8 Drawing Sheets (56) References Cited

U.S. PATENT DOCUMENTS

| | | | |
|---|---|---|---|
| 2015/0199395 A1 | 7/2015 | Greenstein et al. | |
| 2016/0094936 A1* | 3/2016 | Yang | H04Q 9/00 |
| | | | 455/456.1 |
| 2016/0232195 A1* | 8/2016 | Davis | G06F 16/2365 |
| 2016/0247205 A1* | 8/2016 | Ziliacus | G06Q 30/0251 |
| 2016/0321315 A1 | 11/2016 | Scagnol et al. | |
| 2017/0160892 A1 | 6/2017 | Lu et al. | |
| 2017/0302725 A1* | 10/2017 | Carr | G06F 16/256 |
| 2017/0325067 A1* | 11/2017 | Greenberger | H04W 4/025 |
| 2018/0007099 A1* | 1/2018 | Ein-Gil | H04L 63/08 |
| 2018/0052873 A1 | 2/2018 | DeLuca | |
| 2018/0173706 A1 | 6/2018 | Dev | |
| 2019/0163796 A1 | 5/2019 | Hodge et al. | |

OTHER PUBLICATIONS

M Jayanthi; "Avoiding duplicates using Randomized Protocols in Cloud"; published in International Journal of Computer Science and Information Technology, 2015; 1 (2); pp. 24-26: http://iaard.net/images/Avoiding%20duplicates%20using%20Randomized%20Protocols%20in%20Cloud.pdf.

GetCloudServices team; "Optimizing VDI Virtual Desktop Performance in Distributed Clouds"; 5 pages, retrieved on Aug. 29, 2016 from http://www.getcloudservices.com/blog/optimizing-vdi-virtual-desktop-performance-in-distributed-clouds/.

Don MacVittie; "Stop Repeating Yourself. Deduping WAN-Opt Style"; published on-line on Jun. 30, 2010; 4 pages; http://www.cloudcomputingexpo.com/node/1451790.

Non-final Office Action issued in U.S. Appl. No. 15/385,876 dated Aug. 19, 2019, 11 pages.

* cited by examiner

```
{
  "type":"custom",
  "version":1,
  "value":[
    {
      "name":"orientation",
      "dataType":"number",
      "frequencyUnit":"minute",
      "frequencyValue":5,
      "isCustom":true
    },
    {
      "name":"likes",
      "dataType":"string",
      "frequencyUnit":null,
      "frequencyValue":0,
      "isCustom":true
    },
    {
      "name":"bought",
      "dataType":"string",
      "frequencyUnit":null,
      "frequencyValue":0,
      "isCustom":true
    }
  ]
}
```

410

```
"contextProfile":[
  {
    "type":"location",
    "version":1,
    "value":[
      {
        "name":"longitude",
        "dataType":"number",
        "frequencyUnit":"minute",
        "frequencyValue":5,
        "isCustom":false
      },
      {
        "name":"latitude",
        "dataType":"number",
        "frequencyUnit":"minute",
        "frequencyValue":5,
        "isCustom":false
      },
      {
        "name":"accuracy",
        "dataType":"number",
        "frequencyUnit":"minute",
        "frequencyValue":5,
        "isCustom":false
      }
    ]
  }
]
```

```
{ "data":[
    {
    "type":"location",
    "version":1,
    "time":"2015-02-10T09:10:00+00:00",
    "value":{
        "latitude":49.12345,
        "longitude":-8.2899
        }
    },
    {
    "type":"custom",
    "version":1,
    "time":"2015-02-10T09:10:00+00:00",
    "value":{
        "likes":"shoes",
        "bought":"electronics"
        }
    }
]}
```
510

```
{
"type":"custom",
"version":1,
"time":"2015-02-10T09:10:00+00:00",
"value":{
    "likes":[
        "horror",
        "comedy"
        ],
    "bought":[
        "electronics",
        "apparel"
        ]
    }
}
```
520

MANAGEMENT OF CONTEXT DATA

FIELD

Embodiments described herein relate to dynamic control of execution, processing, or sequencing of instruction data within a computer system. Further, tools and techniques to store volatile data contained in processor registers, and to restore the volatile data at some later point in time are described.

BACKGROUND

A context-aware system is a system that has the ability to gather information and to adapt behavior according to the gathered information. Context-aware computing systems include software and hardware working together to automatically collect and analyze context data, and perform actions based on the analysis. In addition to context-aware computing, context data that provides context awareness is a technological prerequisite for a number of concepts including machine to machine (M2M), internet of things (IoT), ubiquitous computing, and event-driven computing.

Context data may be information relevant to a given entity (e.g., a person, a device, or an application). Examples of such context data include location, user profile, device, environment, activity, health, social, network, and role. Context data for context-aware computing may be acquired through context providers such as web browsers, cameras, microphones, Global Positioning Satellite (GPS) receivers, sensors, etc.

Typically, the context providers collect and send the context data to a server. The server processes the received context data and performs one or more actions as configured. However, in some cases the received context data is redundant. For example, location of a context provider might remain unchanged for a certain period of time. Nevertheless, the server is configured to process context data received from the context provider. This way, the server processes the redundant data repeatedly, causing excessive system load that may lead to increased total cost of ownership (TCO).

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for management of context data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
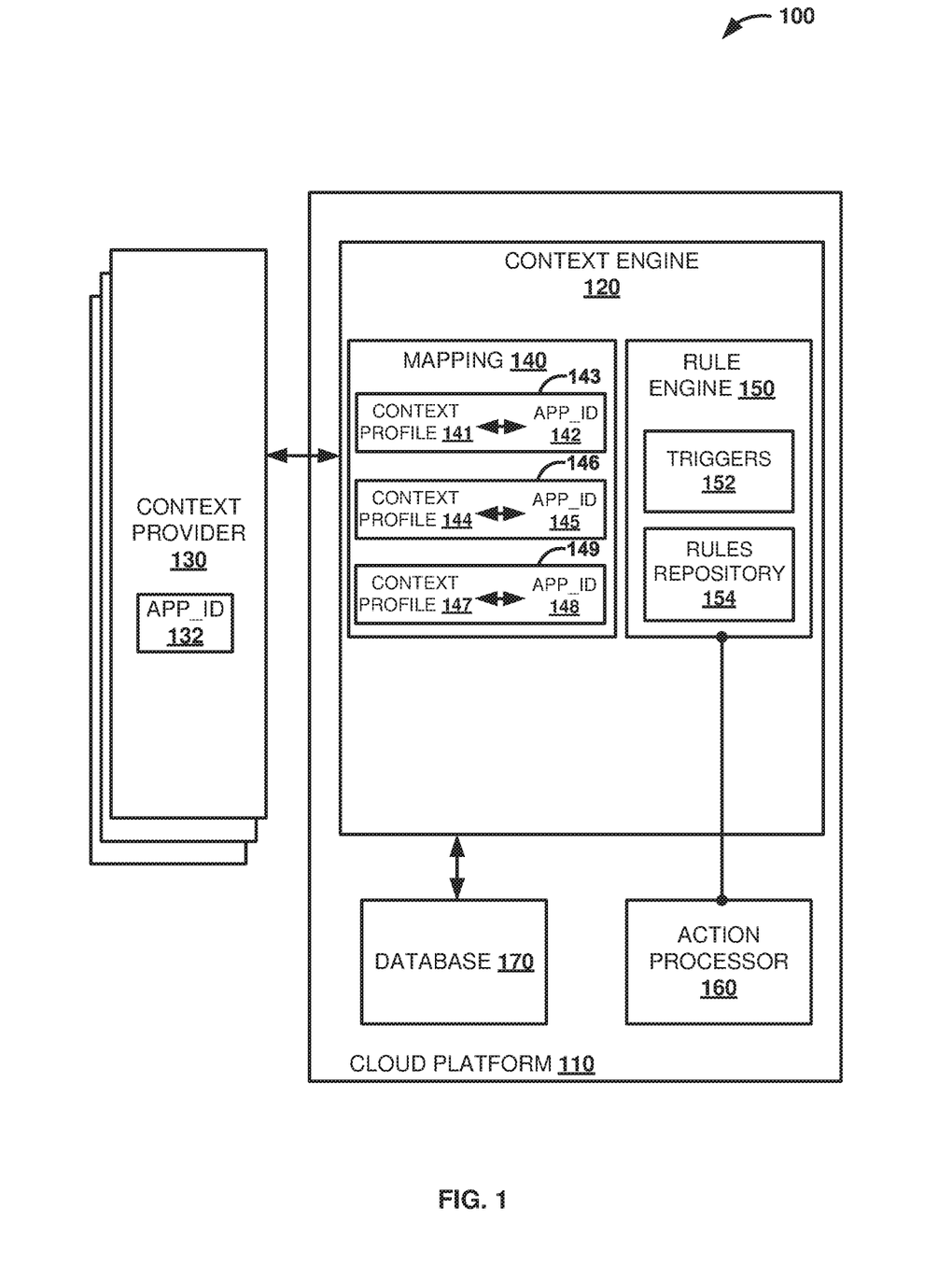
FIG. 1 is a block diagram illustrating an architecture to manage context data based on a context profile and one or more data processing rules, according to one embodiment.

FIG. 1 is a block diagram illustrating architecture 100 to manage context data based on a context profile and one or more data processing rules, according to one embodiment. Architecture 100 includes cloud platform 110 and context provider 130.

Cloud platform 110 can be viewed as containing both physical layer and abstraction layer. The physical layer may include hardware resources to support cloud services being provided and typically includes a server, a storage unit, network components, and so on. The abstraction layer may include software components deployed across the physical layer that manifest functionalities provided by cloud platform 110. For example, cloud platform 110 may provide application runtime, user interface (UI) development toolkits, internal configurations, and one or more cloud services such as a connectivity service, a database access service, a persistence service, an identity service, a feedback service, a document service, etc. The functionality provided by cloud platform 110 can be utilized by customers of cloud platform 110 to develop and/or deploy software applications on cloud platform 110. In one embodiment, the software applications may be developed via functionality of cloud platform 110. In one embodiment, cloud platform 110 may also provide support for an application lifecycle process, for example, deployment, installation, provisioning and maintenance of applications that may be built, deployed, installed and run on cloud platform 110. In one embodiment, cloud platform 110 may be a platform-as-a-service (PaaS).

In one embodiment, context provider 130 collects context data. Context provider 130 sends the collected context data to cloud platform 110. Context provider 130 can be described as an entity that is configured to collect and send context data for processing. For example, context provider 130 can be a web browser, a GPS receiver, a camera, a microphone, a sensor, an IoT object (e.g., a device embedded with electronics, software, sensors, actuators, and network connectivity that enables the device to collect and exchange data), a mobile application, an event provider, etc.

In one embodiment, context provider 130 sends the context data to context engine 120 that is part of cloud platform 110.

In one embodiment, cloud platform 110 includes context engine 120 and action processors 160. Context engine 120 receives and processes the collected context data from context provider 130. In one embodiment, context engine 120 is a context management cloud service provided by cloud platform 110. In addition to receiving and processing the context data, context engine 120 is configured to provide a context profile to context provider 130 prior to data collection. For example, context provider 130 opens a communication channel over a network (e.g., the Internet) to context engine 120. The communication channel can be established over HyperText Transfer Protocol (HTTP). Initially, context provider 130 may send a handshake request to context engine 120. Handshaking is an automated process of negotiation between entities on a network to set parameters of the communication channel. Handshaking precedes information transfer. In one embodiment, the handshake request sent by context provider 130 includes an application identifier (e.g., APP_ID 132). The application identifier uniquely identifies context provider 130 among other context providers that may communicate with context engine 120.

In one embodiment, context engine 120 includes mapping 140. Mapping 140 includes a number of associations of context profiles to corresponding application identifiers. For example, mapping 140 includes mappings 143, 146, and 149. In mapping 143, context profile 141 is associated with application identifier APP_ID 142. Similarly, context profile 144 is associated with application identifier APP_ID 145 in mapping 146 and context profile 147 is associated with application identifier APP_ID 148 in mapping 149.

In one embodiment, context engine 120 sends a context profile corresponding to the received application identifier. For example, context provider 130 includes application identifier APP_ID 132 in the handshake request. When the communication channel between context provider 130 and context engine 120 is established, context engine 120 sends the context profile to context provider 130. In one embodiment, application identifier APP_ID 132 represents a reference to application identifier APP_ID 142 of mapping 140. Therefore, based on mapping 140, context engine 120 determines that context profile 141 corresponds to application identifier APP_ID 142. Context engine 120 extracts context profile 141 from a dedicated storage (e.g., a database) and sends context profile 141 to context provider 130.

In one embodiment, context profiles such as context profile 141 are created by an administrator via a dedicated user interface (UI) (not illustrated) of context engine 120. Further, the created context profiles are associated with corresponding application identifiers in mapping 140. Once created, the context profiles are stored by context engine 120. For example, the context profiles can be stored in a database table of database 170 accessible to context engine 120. In one embodiment, database 170 is an in-memory database that is part of cloud platform 110. It should be appreciated, however, that the context profiles may be stored in a database that is not part of cloud platform 110 and is accessed through a network such as the Internet.

In one embodiment, context engine 120 sends context profile 141 to context provider 130, e.g., via a representational state transfer (REST) application programming interface (API) call. It should be appreciated, however, that context profile 141 may be transferred between context engine 120 and context provider 130 via a number of web services that provide interoperability between computer systems on the Internet.

In one embodiment, context profile 141 includes properties of context data to be collected by context provider 130. Context profile 141 specifies a type of context data that context provider 130 has to capture, a frequency in which the context data has to be repeatedly captured and sent to the context engine 120 cloud service, and a data format for the captured context data. One or more context profiles may be created for a context provider such as context provider 130. In one embodiment, a number of context providers such as context provider 130 (e.g., sensors, applications, devices, event providers, etc.) communicate with context engine 120. The number of context providers may receive (simultaneously, sequentially, or in random order) context profiles from context engine 120, collect context data in accordance with the context profiles, and send the collected context data to context engine 120. In one embodiment, the one or more context profiles are associated with corresponding application identifiers in mapping 140 of context engine 120. Based on the association of context profiles to application identifiers, context engine 120 understands what types of context data are relevant for a particular application.

Further, a context profile provides control functionalities to an administrator to dynamically start and stop capturing of certain context data types based on application requirements. For example, context provider 130 may be an application that captures location of an entity (e.g., object, person, or device). Such application may operate in different regions. However, based on legal and/or policy restrictions, capturing location of entities may be forbidden in certain areas. Therefore, capturing of entities' location can be disabled in such scenarios by configuring a context profile that omits location data from the list of context data types to be captured.

In addition, frequency of capturing context data can be configured in the context profile. Referring to the above example of the location data, a context profile for a context provider that captures entities' location may include a frequency parameter that specifies how often the location should be captured. Also, further to the types of context data to be captured by the context provider, a context profile can include one or more custom types of data that are accepted by the context engine. For example, context profile 141 can include custom data types "number" and "string". Similarly, a data format parameter of the context profile may specify a format for the context data. This way, a certain data format can be specified for a type of context data. In accordance with such a data format, the context provider 130 formats the collected context data prior to sending the context data to context engine 120, according to one embodiment.

In one embodiment, upon receiving context profile 141 from context engine 120, context provider 130 initiates context data capturing. Context provider 130 collects and sends one or more types of context data at certain time intervals, as specified by the frequency parameter of context profile 141. For example, the frequency parameter of context profile 141 may have value "5". Further, a separate parameter of context profile 141 (e.g., "frequencyUnit" parameter) may specify units of the frequency parameter (e.g., "minute"). Thus, context profile 141 may specify a 5-minute time interval for sending the collected context data.

In one embodiment, the context data gathered by context provider 130 is sent to context engine 120 via a web service (e.g., a REST API call). The context data can be sent in a data exchange format such as JavaScript® Object Notation (JSON) or eXtensible Markup Language (XML).

In one embodiment, context data received at context engine 120 is processed in accordance with a number of data processing rules. Rules for processing context data are stored in rules repository 154 that is part of rule engine 150. The data processing rules are defined by an administrator. For example, a rule editor tool (not illustrated) of rule engine 150 can be utilized by an administrator to define one or more data processing rules. A data processing rule can be described as a condition to trigger an action. The administrator selects an event (e.g., trigger) for a rule to execute, according to one embodiment. Triggers 152 module of rule engine 150 stores a list of events selected by the administrator to trigger one or more rules, according to one embodiment. A rule can be triggered by presence of either a context change or backend event, or an event raised by mobile application or an external service. In one embodiment, data processing rules are applied as per an event-control-action pattern. That is, data processing rules are in the format of "UPON condition DO action". For example, "UPON location change DO send location". In this case, location will be sent when a change in location is detected.

In one embodiment, once a triggering event is present and a data processing rule is applied, action processor 160 determines an action to be performed by the system. One or more cases (e.g., context data conditions) and filters (e.g., users, device, and date-time range) can be evaluated to determine a subsequent action. In one embodiment, action processor 160 executes the determined subsequent action (e.g. push a notification/message to a smartphone). Optionally, action processor 160 may call an action execution service (not illustrated) such as an event handler to execute the action.

Further, evaluation of data processing rules can be enabled or disabled based on one or more conditions, according to one embodiment. For example, the evaluation can be enabled based on a time range (e.g., rules evaluation may be enabled during working days and disabled during weekends, public holidays, etc.), based on certain days of the week, frequency of context execution in a specified past time interval, frequency of the context execution in the specified past time interval per user, etc.

In one embodiment, based on the one or more data processing rules, context data can be evaluated before or after processing by context engine 120.

In one embodiment, based on context profiles and data processing rules, a two-level context data management mechanism is established on both sides of the context provider-context engine system. Initially, the context provider is configured, via a context profile, whether to collect or not specific types of context data. Further, via the context profile, the context provider can be configured how frequently the collected context data to be sent to the context engine. The context engine is configured, via one or more data processing rules, whether to evaluate or not specific types of context data. Further, the context engine is also configured whether to process or not the evaluated context data. This way, processing of redundant data is avoided and system load may be significantly reduced.

Figure 2:
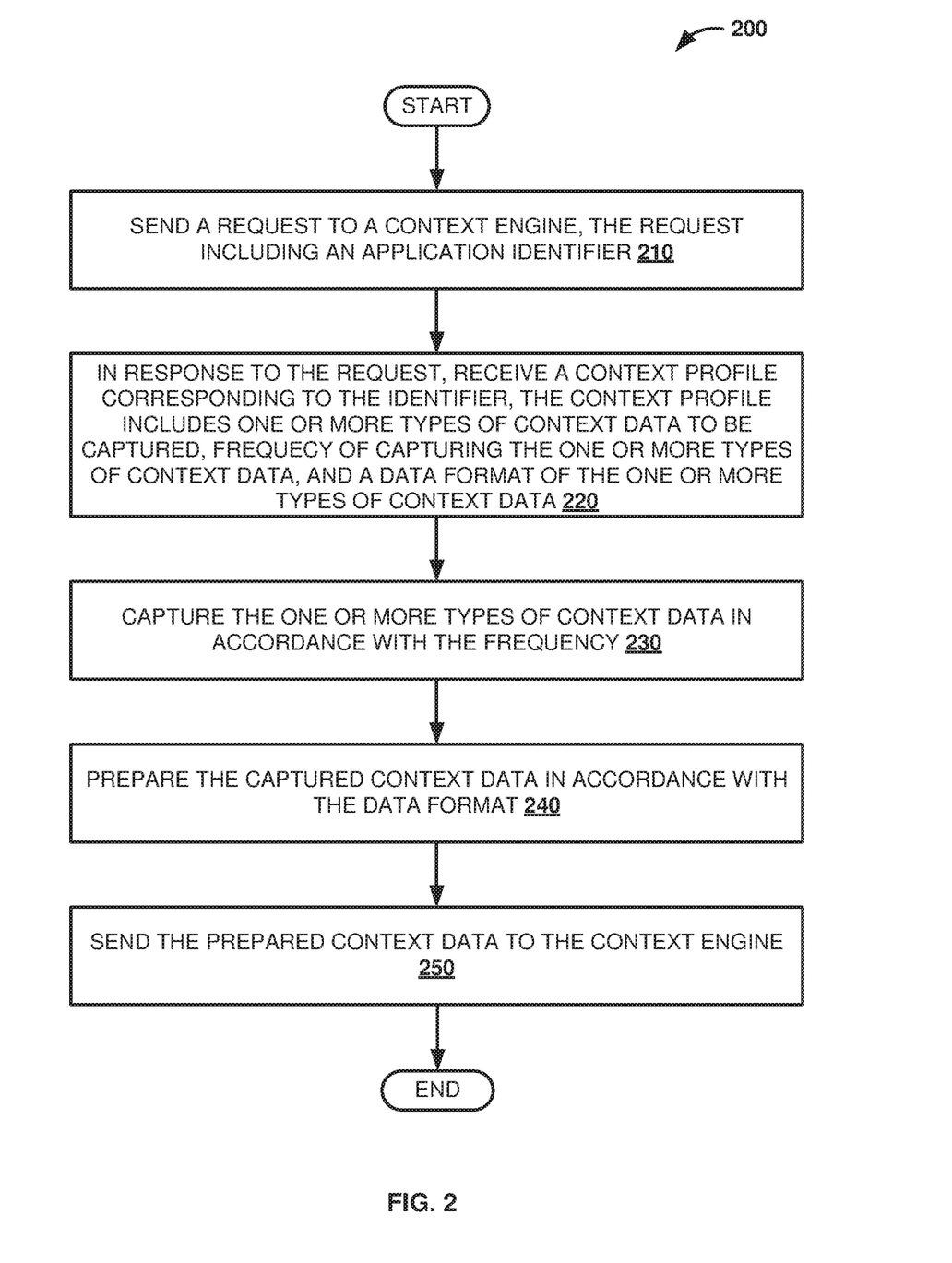
FIG. 2 is a flow diagram illustrating a process to receive a context profile and provide context data in accordance with the received context profile, according to one embodiment.

FIG. 2 is a flow diagram illustrating a process 200 to receive a context profile and provide context data in accordance with the received context profile, according to one embodiment. Process 200 starts at 210 where a request is sent to a context engine. In one embodiment, the request is sent to context engine 120 described above with reference to FIG. 1. For example, a context provider may request to send context data to the context engine for processing. In one embodiment, the context engine receives a handshake request to initiate communication from a context provider. The handshake request includes an application identifier, according to one embodiment. The application identifier uniquely identifies a context provider among a number of context providers that communicate with the context engine.

Next, at 220, a context profile corresponding to the application identifier is received. The context profile specifies one or more types of context data to be captured, a frequency in which context data of the one or more types is captured (e.g., via a frequency parameter), and a data format for the one or more types of context data. At 230, context data of the one or more types is captured. For example, a context provider may collect the types of context data specified by the context profile.

At 240, upon capturing the one or more types of context data, the captured data is formatted in accordance with the context profile. That is, the context provider formats the captured data to comply with the data format from the received context profile. Upon formatting of the captured context data, at 250, the formatted context data is sent to the context engine by the context provider.

Figure 3:
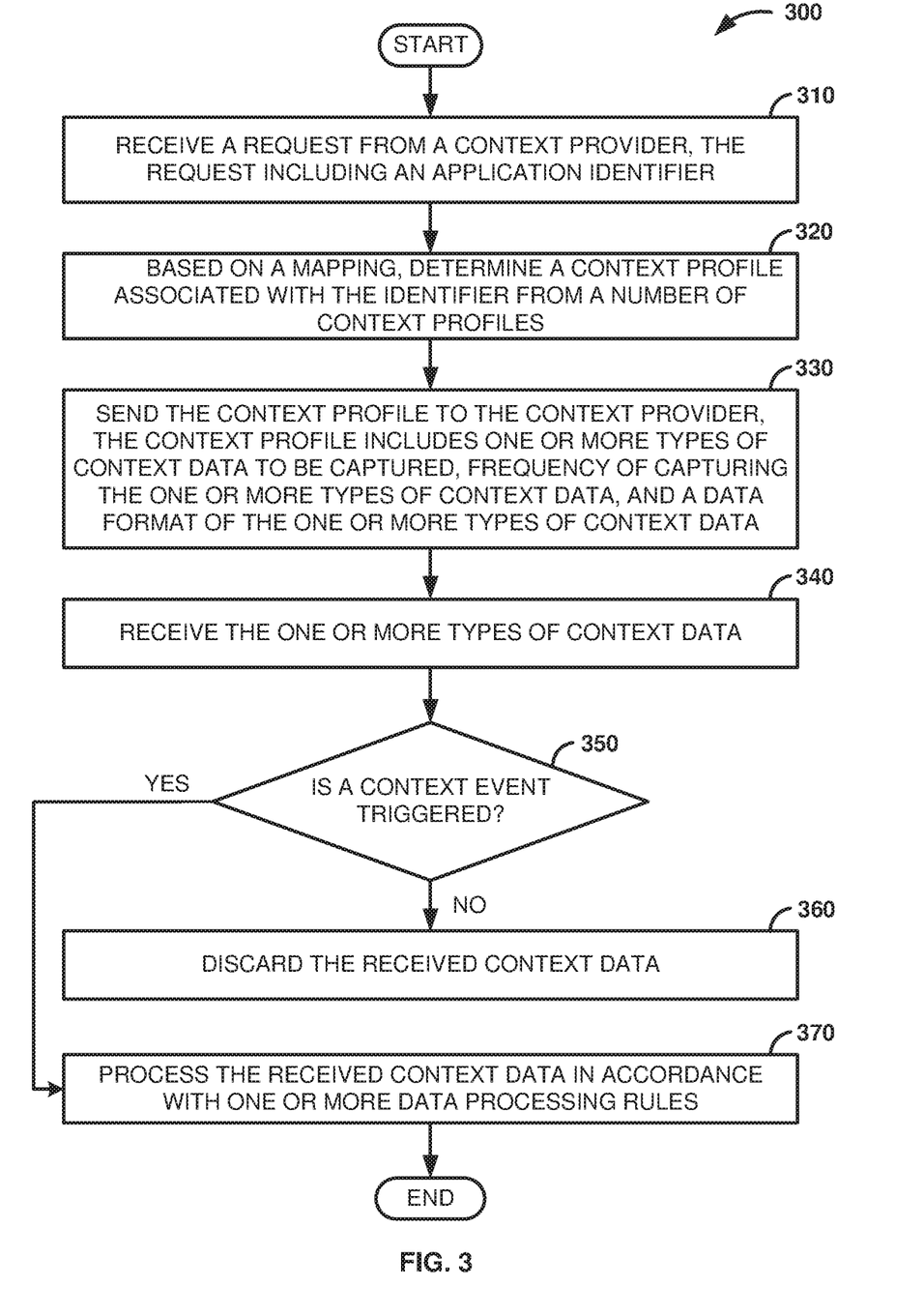
FIG. 3 is a flow diagram illustrating a process to provide a context profile and to process received context data, according to one embodiment.

FIG. 3 is a flow diagram illustrating a process 300 to provide a context profile and to process received context data, according to one embodiment. At 310, a request from a context provider is received. The request includes an application identifier. In one embodiment, the application identifier is associated with a corresponding context profile. For example, a mapping of application identifiers to context profiles may be created and stored at a context engine. Next, at 320, a context profile associated with the received application identifier is determined based on the mapping. At 330, the determined context profile is sent to the context provider. For example, the context profile can be sent from the context engine to the context provider in response to a REST API call. In one embodiment, the context profile includes one or more types of context data to be captured, a frequency parameter specifying frequency of capturing the one or more types of context data, and a data format of the one or more types of context data.

At 340, the one or more types of context data are received. In one embodiment, the captured context data of the one or more types is sent from the context provider to the context engine. For example, in a data exchange format such as JSON or XML. Next, at 350, the context data is evaluated and a check is performed to determine whether a context event is present. In one embodiment, an event-control-action pattern is implemented to determine whether a context event is present. That is, in accordance with the event-control-action pattern, an action is executed based on an event. When a context event is not present, at 360, the received context data is discarded without processing. In one embodiment, when the context event is not present, the received context data is stored for processing at a later point of time.

In one embodiment, based on the check, it is determined that a context event is present. Therefore, at 370, the received context data is processed in accordance with one or more data processing rules. The one or more data processing rules are established at the context engine, according to one embodiment. A data processing rule of the one or more data processing rules specifies when a certain action to be performed. Referring to the location example described above with reference to FIG. 1, a data processing rule may specify that received context data for location is processed when there is a change of the location. For example, the data processing rule may read: "UPON change location DO process received context data".

Figure 4:
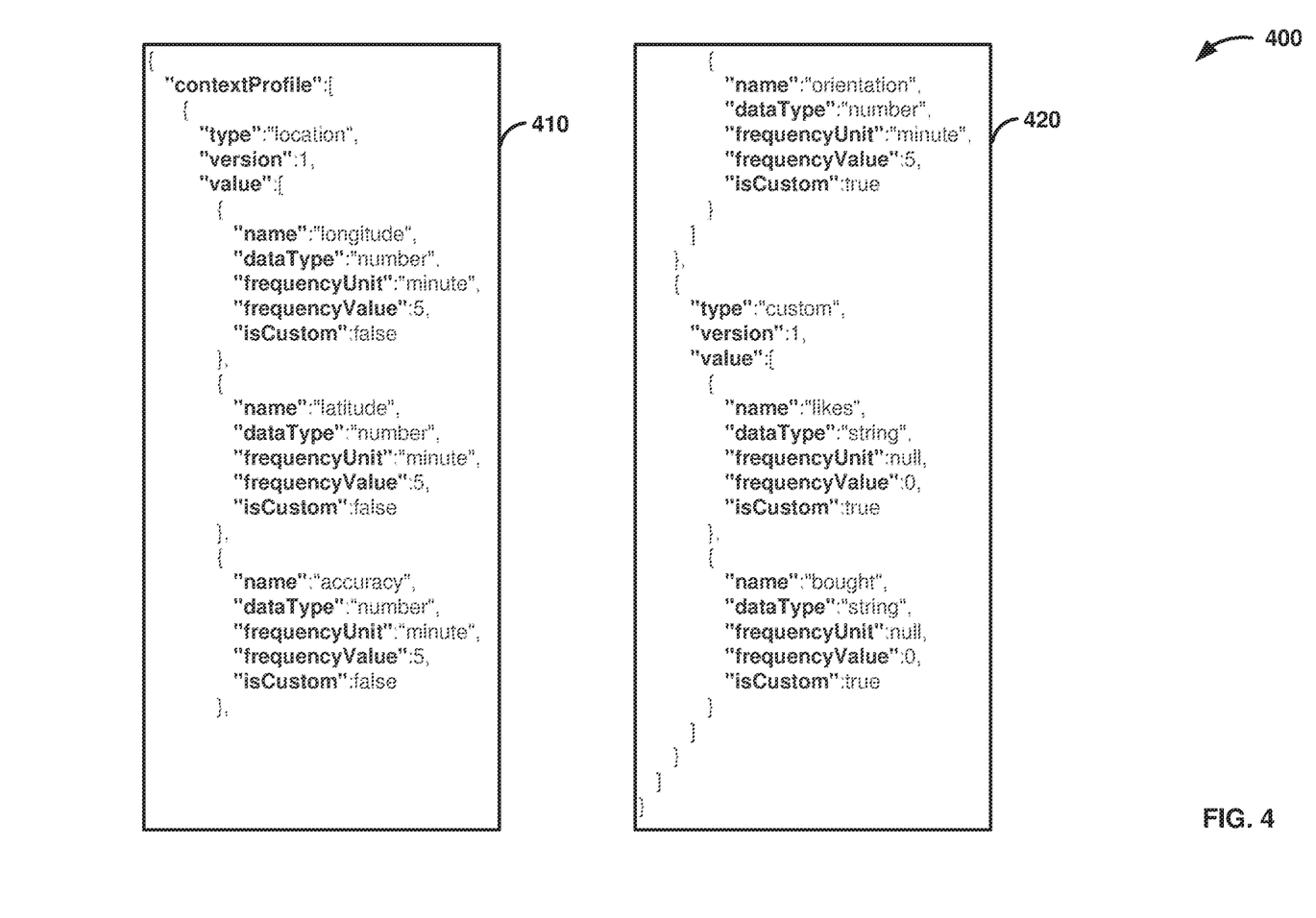
FIG. 4 is an exemplary source code representing a context profile, according to one embodiment.

FIG. 4 is an exemplary source code 400 representing a context profile, according to one embodiment. Exemplary source code 400 includes a first portion 410 and a second portion 420 of source code. Exemplary source code 400 defines a context profile including two types of context data, namely "location" and "custom", according to one embodiment.

In one embodiment, a type of context data of a context profile may further include one or more subtypes of context data. For example, exemplary context profile source code 400 includes context data type "location" having context data subtypes "longitude", "latitude", "accuracy", and "orientation". Similarly, context data type "custom" includes context data subtypes "likes" and "bought".

Figure 5:
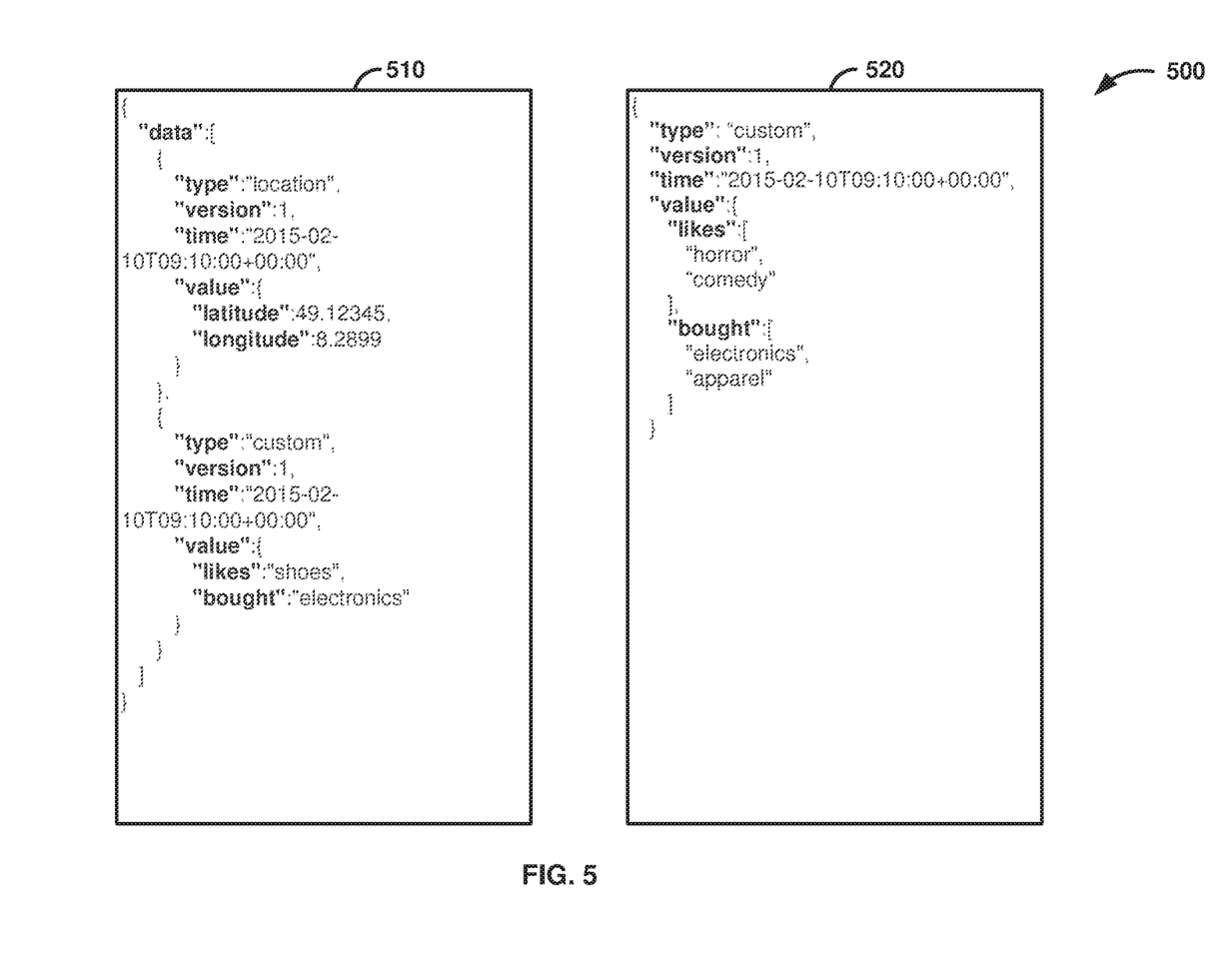
FIG. 5 is an exemplary source code representing context data captured and sent in accordance with a context profile, according to one embodiment.

FIG. 5 is an exemplary source code 500, representing context data captured and sent in accordance with a context profile. For example, the context data is captured and sent in accordance with the context profile described above with reference to FIG. 4. In one embodiment, exemplary source code 500 includes context data 510 and context data 520. Context data 510 includes types and corresponding subtypes of context data, as specified by the context profile. In one embodiment, more than one entry for a subtype of context data can be sent. Context data 520 includes context data of type "custom" with subtypes "likes" and "bought", respectively. In one embodiment, context data 520 includes two entries of data per a context data subtype (e.g., "likes"—"horror" and "comedy" and "bought"—"electronics" and "apparel")

Figure 6:
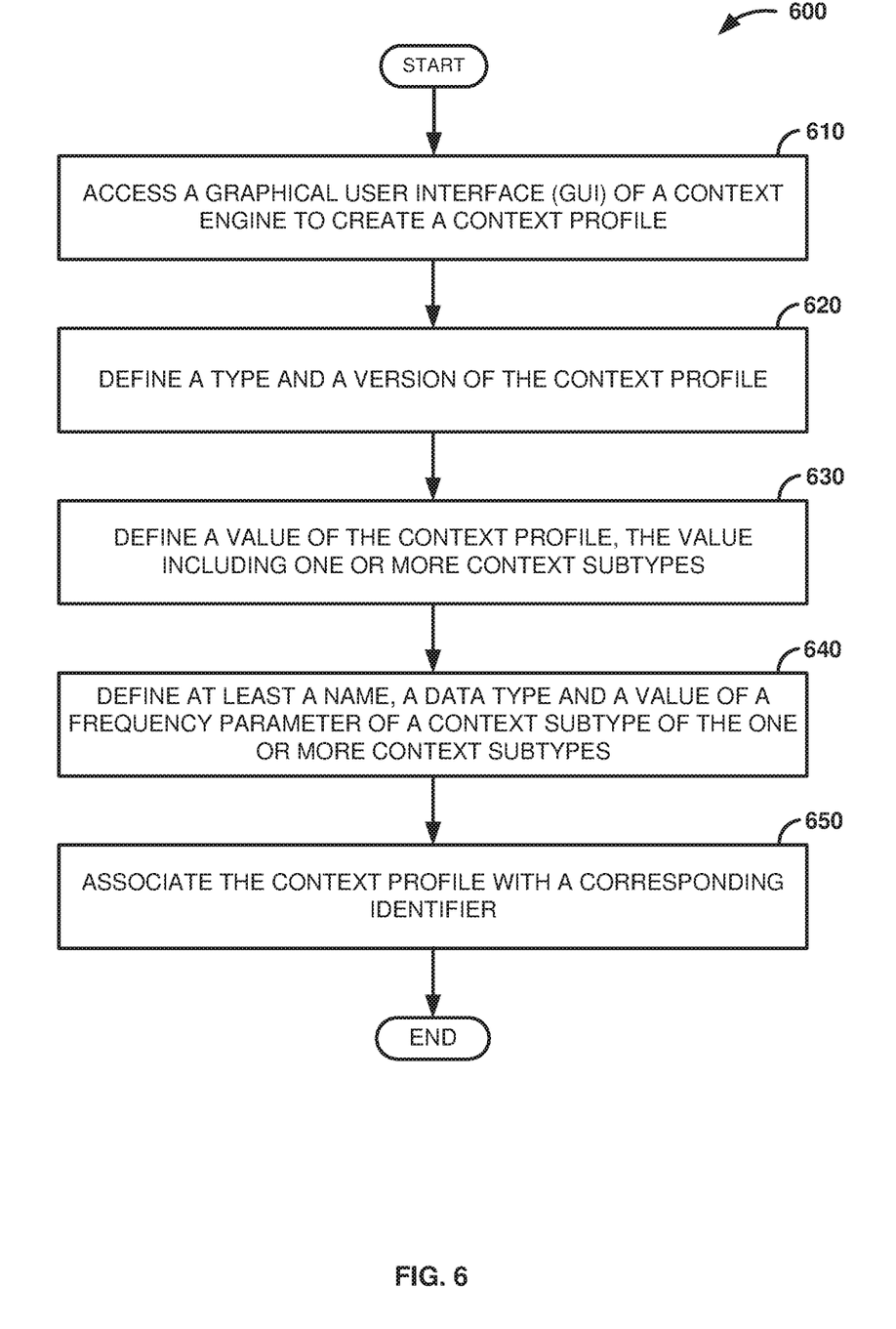
FIG. 6 is a flow diagram illustrating a process to create a context profile for an application, according to one embodiment.

FIG. 6 a flow diagram illustrating a process 600 to create a context profile for an application, according to one embodiment. Through a context profile, a context engine such as context engine 120 described above with reference to FIG. 1 understands what types of context data is relevant for a particular application. Context profiles are created by users that are granted sufficient access rights to create and manage context profiles. For example, a system administrator may create the context profile. At 610, a graphical user interface (GUI) of a context engine is accessed by the administrator to create the context profile. At 620, a type and a version of the context profile are defined. At 630, a value of the context profile is defined. In one embodiment, the value of the context profile includes one or more context subtypes. For example, context type "device" has value the subtypes "battery", "memory", "brand", "model", etc.

Next, at 640, for a subtype of the one or more subtypes, at least a name, a data type, and a value of a frequency parameter are defined. Process 600 ends at 650, where the created context profile is associated with a corresponding identifier. For example, a mapping may be created at the context engine. The mapping may include a number of context profiles associated with corresponding identifiers, according to one embodiment.

Figure 7:
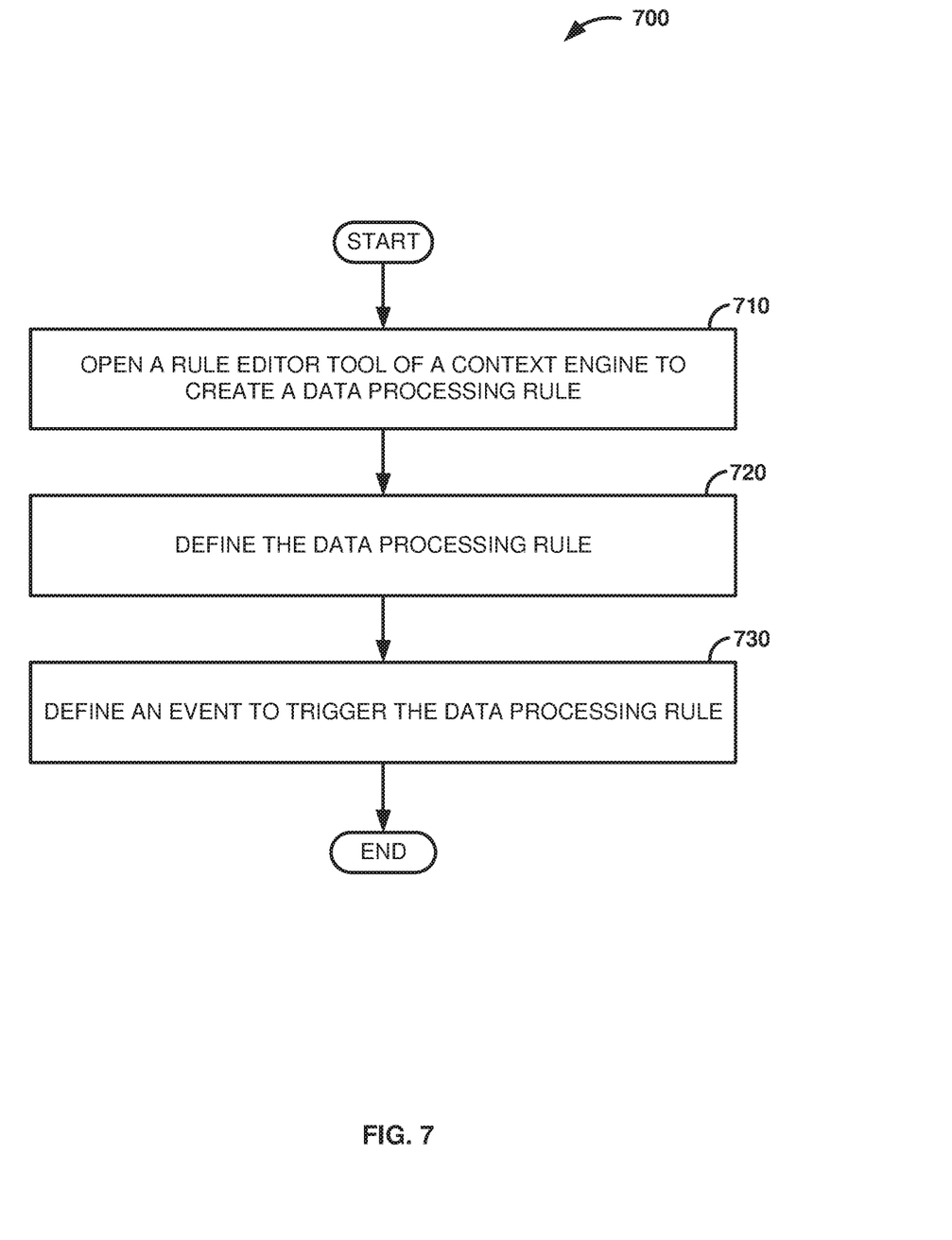
FIG. 7 is a flow diagram illustrating a process to establish a data processing rule, according to one embodiment.

FIG. 7 is a flow diagram illustrating a process 700 to establish a data processing rule, according to one embodiment. Process 700 starts at 710, where a rule editor is opened to create a data processing rule. For example, the rule editor can be provided by rule engine 150 described above with reference to FIG. 1 Next, at 720, the data processing rule is defined. Further, at 730, at least one event to trigger the data processing rule is defined. In one embodiment, an administrator selects an event (e.g., trigger) for the data processing rule to execute. A rule can be triggered by the presence of either a context change or backend event, or an event raised by mobile application or an external service. In one embodiment, the data processing rule is applied in accordance with an event-control-action pattern. That is, the data processing rule is in the format of "UPON condition DO action". For example, "UPON location change DO send location".

Some embodiments may include the above-described methods being written as one or more software components. These components, and the associated functionality, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system that causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
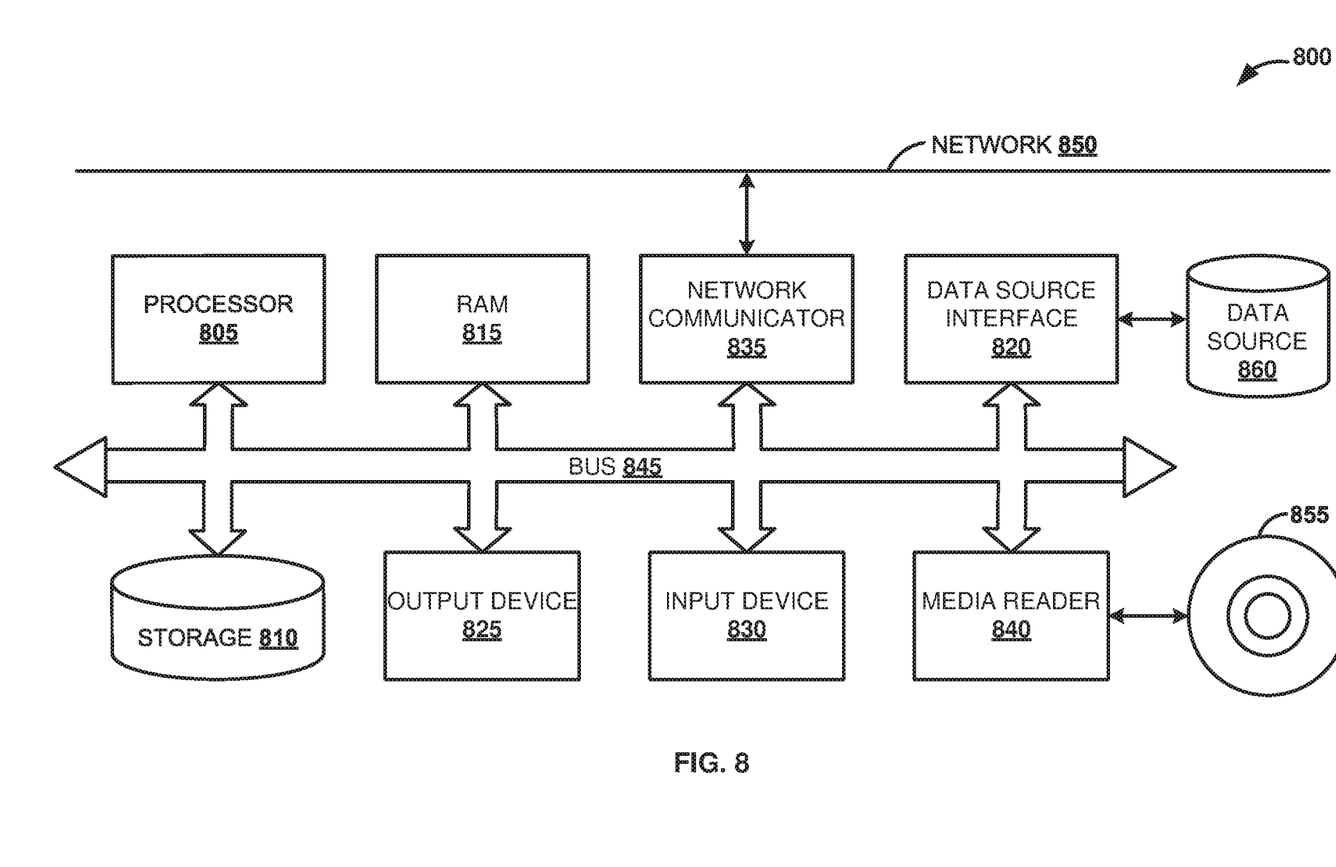
FIG. 8 is a block diagram of an exemplary computer system, according to one embodiment.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. These output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to interpreted in accordance with established doctrines of claim construction.

What is claimed is:

1. A computer implemented method to manage context data, the method comprising:
   receiving, from a context engine and at a context provider, a context profile corresponding to an application, wherein the context profile comprises one or more types of context data;
   repeatedly capturing, by the context provider, context data of a specific type of the one or more types of context data, at a frequency corresponding to the specific type of context data, wherein the context profile specifies the frequency of repeatedly capturing the context data of the specific type;
   formatting, by the context provider, the captured context data of the specific type in a corresponding data format; and
   outputting, by the context provider and to the context engine, the formatted context data of the specific type of context data at the frequency corresponding to the specific type of context data as specified in the context profile.

2. The method of claim 1, wherein receiving the context profile further comprises:
   sending a request for the context profile, wherein the request comprises an application identifier.

3. The method of claim 2, wherein the application identifier is associated with the received context profile corresponding to the application.

4. The method of claim 2, wherein the received context profile is associated with a plurality of application identifiers corresponding to a plurality of applications.

5. The method of claim 1, wherein the context profile specifies a frequency of repeatedly capturing context data of each specific type of the one or more types of context data.

6. The method of claim 1, wherein the context profile specifies the data format corresponding to the specific type of context data.

7. The method of claim 1, wherein the context profile further comprises at least one context subtype corresponding to the specific type of context data.

8. A computer system to manage context data, the system comprising:
   a memory to store instructions;
   at least one processor in communication with the memory to execute the stored instructions to generate:
   at least one context profile associated with at least one application identifier of a plurality of application identifiers, wherein the at least one context profile comprises:
   one or more types of context data;
   one or more frequency parameters corresponding to the one or more types of context data, wherein the one or more frequency parameters specify frequency for capturing context data corresponding to the one or more types of context data; and one or more format parameters specifying one or more data formats for the one or more types of context data;

a context engine that sends the at least one context profile to a context provider in response to a request, and receives context data of the one or more types of context data at the specified frequency for capturing context data corresponding to the one or more types of context data from the context provider; and a plurality of data processing rules, wherein the context data is processed in accordance with the plurality of data processing rules.

9. The system of claim 8, wherein the request comprises the at least one application identifier.

10. The system of claim 8, wherein the context engine comprises a plurality of conditions corresponding to a data processing rule of the plurality of data processing rules, and wherein the plurality of conditions comprise a first condition for enabling the data processing rule and a second condition for disabling the data processing rule.

11. The system of claim 8, wherein the context engine further performs operations comprising:
evaluate the received context data;
determine whether a context event is present; and
when the context event is present, apply a data processing rule of the plurality of data processing rules that corresponds to the context event.

12. The system of claim 11, further comprising:
when the context event is not present, discard the received context data to reduce memory consumption.

13. A computer implemented method to manage context data, the method comprising:
receiving, by a context engine and from a context provider, a request comprising an application identifier;
determining, by the context engine, a context profile associated with the application identifier;
sending, by the context engine and to the context provider, the context profile, wherein the context profile comprises one or more types of context data, and wherein, for a specific type of the one or more types of context data, the context profile further comprises a frequency of capturing context data of the specific type of context data;
repeatedly receiving, by the context engine, context data of the specific type at the frequency of capturing the context data of the specific type of context data specified in the context profile; and processing, by the context engine, the received context data in accordance with a plurality of data processing rules, wherein processing the received context data comprises:
evaluating the received context data;
determining whether a context event is present or is not present; and
when it is determined that the context event is not present, discarding the received context data to reduce memory consumption.

14. The method of claim 13, wherein determining a context profile associated with the application identifier further comprises:
searching for the application identifier in a mapping of a plurality of application identifiers to a plurality of context profiles.

15. The method of claim 13, wherein receiving the context data of the specific type further comprises:
repeatedly receiving context data of each specific type of the one or more types of context data at a frequency of capturing context data corresponding to the specific type of the one or more types of context data as specified in the context profile.

16. The method of claim 13, wherein processing the received context data further comprises:
when it is determined that the context event is present, applying a data processing rule of the plurality of data processing rules that corresponds to the context event.

17. The method of claim 16, wherein the context engine comprises one or more conditions corresponding to the data processing rule, and wherein the one or more conditions comprise a first condition for enabling the data processing rule and a second condition for disabling the data processing rule.

18. The method of claim 13, wherein the context profile further comprises at least one context subtype corresponding to the specific type of context data and a format parameter corresponding to the specific type of context data.

19. The method of claim 1, wherein the context profile further comprises a list of one or more types of content data to be captured, and wherein the context profile specifies at least a second specific type of context data of the one or more types of context data that is to be omitted from the list of the one or more types of context data to be captured.

* * * * *